United States Patent

[11] 3,568,720

| [72] | Inventors | Karl-Hans Staat<br>Homberg;<br>Theodor Zacharias, Krefeld; Horst Lubke,<br>Hilden, Germany |
|---|---|---|
| [21] | Appl. No. | 799,344 |
| [22] | Filed | Feb. 14, 1969 |
| [45] | Patented | Mar. 9, 1971 |
| [73] | Assignee | Friedrick Kocks |

[54] CLAMPING DEVICE FOR SEALING AND CLAMPING HEADS
6 Claims, 14 Drawing Figs.

[52] U.S. Cl. ............................................. 138/89, 73/49.5, 138/90
[51] Int. Cl. ............................................. F16l 55/10
[50] Field of Search ............................................. 138/90, 89 (Cursory), 89.3 (Cursory), 93 (Cursory); 285/(Inquired); 277/71 (Cursory), 151; 73/49.5, 49.8

[56] References Cited
UNITED STATES PATENTS

| 3,473,574 | 10/1969 | Bindernagel et al. | 138/109 |
| 2,398,270 | 4/1946 | Zahodiakin | 277/151 |
| 3,448,773 | 6/1969 | Bindernagel et al. | 138/90 |

FOREIGN PATENTS

| 1,401,761 | 4/1965 | France | 73/49.5 |

Primary Examiner—Laverne D. Geiger
Assistant Examiner—Richard J. Sher
Attorney—Buell, Blenko and Ziesenheim ABSTRACT: A sealing clamp is provided for one-sided holding and closing of hollow articles such as pipe consisting of a cylindrical elastic sealing sleeve and an elastic cylindrical clamping part arranged at the inner circumference of this sleeve and made of harder material in the form of spaced bars held apart by spring force acting in at least one axial recess in each bar.

PATENTED MAR 9 1971

INVENTORS
Karl-Hans Staat,
Theodor Zacharias and
Horst Lübke

Buell, Blenko & Ziesenheim
Their Attorneys

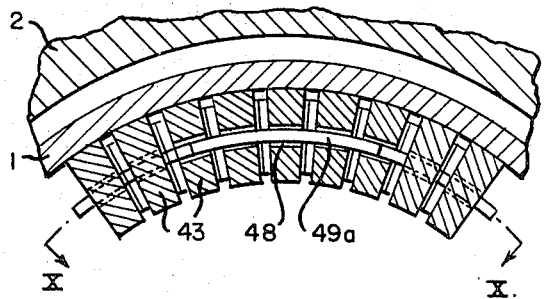
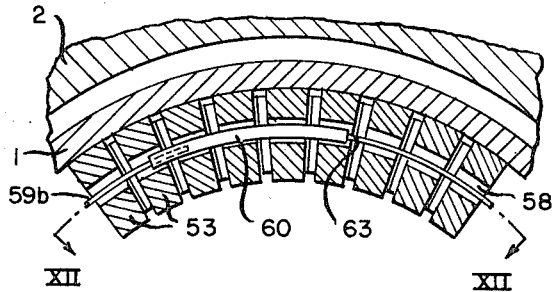
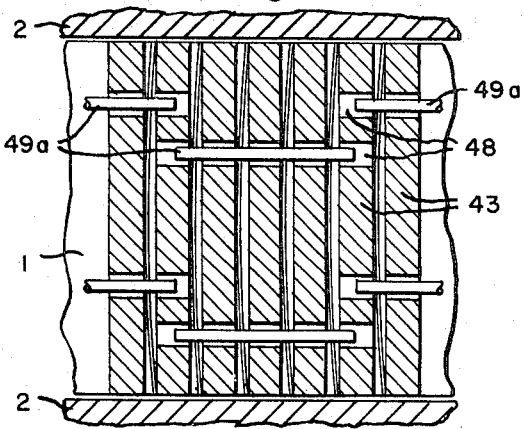
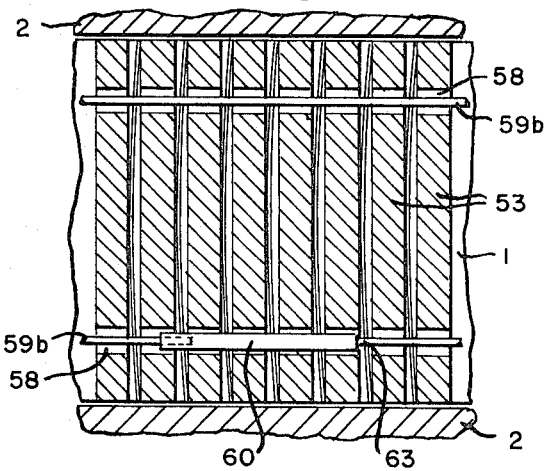
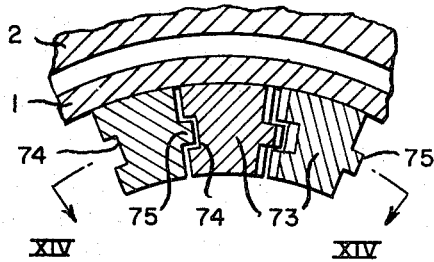
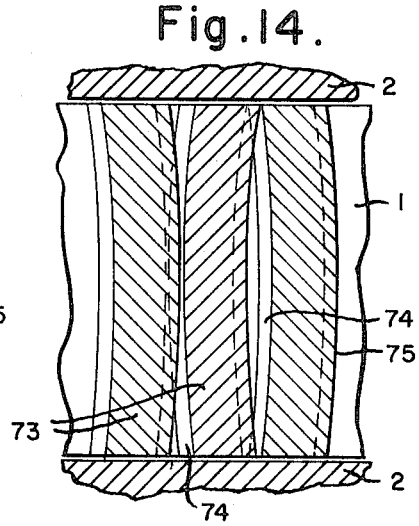

CLAMPING DEVICE FOR SEALING AND CLAMPING HEADS

This invention relates to clamping devices for sealing and clamping heads and particularly a clamping device for clamping heads for sealing hollow articles to be tested such as pipes and the like. Sealing heads and clamping heads for which such a clamping device can be used are described in U.S. Pat. No. 3,331,238.

This present application is an improvement upon U.S. Pat. No. 3,473,574 which generally stated relates to a clamping device for sealing and clamping heads for one-sided closing and clamping of hollow articles to be tested, especially pipes, and consists of a cylindrical sealing sleeve and an elastic cylindrical clamp part arranged around the inner circumference of this sleeve and made out of harder material than the sleeve material. According to U.S. Pat. 3,473,574, the clamp part consists of a number of bars, having a rectangular or trapezoid cross section, separated by gaps and held against each other by spring force. These bars can be connected to the inner circumference of the sealing sleeve by casting the sleeve material to the bars or by gluing the bars to the sleeve. The procedure of casting or gluing, however, can be avoided if according to U.S. Pat. 3,473,574 a procedure is used where leaf springs are placed between two neighboring bars which can hold the bars in constant contact with the inner circumference of the sealing sleeve. It is, however, required to secure the leaf springs against radial dislocation toward the inside with relation to the bars. Besides that, it could become necessary, especially for large diameters, to secure the bars also against radial dislocation against each other. According to U.S. Pat. No. 3,473,574, this is done by a method applying a constant force generated by ring springs, which are located in recesses of the bars and which hold the bars and the leaf springs in contact with the inner circumference of the sealing sleeve.

The advantage of the design of U.S. Pat. No. 3,473,574 is easy assembly, and the disadvantage is that the bars, especially bars with trapezoid cross section, have to be machined and deburred individually for machining the recesses, which substantially increases the production cost, especially for clamping devices to be used for large pipe diameters and with a large number of bars. The greatest disadvantage, however, of this design is that the surface of the clamping device enclosing the hollow body is not uniform in the axial direction, but has recesses and notches. Therefore it is possible that the bars are pushed out in axial direction when the hollow body is moved in and out of the clamping head.

It is the purpose of this invention to eliminate the disadvantages of the above design but still use the advantages that are inherent. This is done according to the invention by securing the springs between the bars not by applying a force to hold them against radial dislocation but by securing them by using a certain shape. This way it is possible to eliminate completely recesses and notches at the inner surface of the bars and thus achieve a uniform inside surface, which is according to design of U.S. Pat. 3,473,574, only possible if the bars are connected to the sealing sleeve by using the time-consuming and difficult working method of gluing or casting.

Securing of the springs and if necessary of the bars against radial dislocation relative to each other by using a certain shape can be done in various ways according to the present invention. In one possible design according to the present invention, the springs are arranged and located in longitudinal grooves at the side surface of the bars running in axial direction. If every bar has one longitudinal groove, the springs are secured against radial dislocation toward the inside with relation to the bars. However, it would still be possible that an individual bar with the spring located in its groove could be moved radially, which is not very likely with small diameters, but could easily happen with larger diameters. The preferred design is therefore especially for large diameters, one with longitudinal notches at both sides of the bars.

Using another method, the springs are secured by pins which penetrate through the springs in circumferential direction and protrude into the bars. The pins can be so arranged that they form ring segments or rings.

In U.S. Pat. No. 3,473,574 the possibility was already mentioned to replace the springs between the bars by using bars which have spring characteristics in their circumferential direction. The invention can also be realized in that form also by securing adjoining bars against radial dislocation using recesses and notches cut into these bars.

We have set out certain objects, purposes and advantages of our invention in the foregoing statement. Other objects, purposes and advantages of this invention will be apparent from a consideration of the following description and the accompanying drawings in which:

FIG. 9 is a fragmentary cross section of a fifth embodiment of a clamping device according to our invention;

FIG. 10 is a section on the line X–X of FIG. 9;

FIG. 11 is a fragmentary cross section of a sixth embodiment of clamping device according to our invention;

FIG. 12 is a section on the line XII–XII of FIG. 11;

FIG. 13 is a fragmentary cross section of a seventh embodiment of clamping device according to our invention; and FIG. 14 is a section on the line XIV–XIV of FIG. 13.

Figure 1:
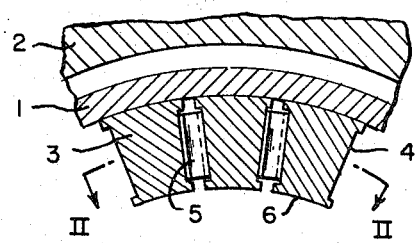
FIG. 1 is a fragmentary cross section of a first embodiment of a clamping device according to our invention.

Referring to the drawings we have illustrated an elastic sealing sleeve 1, made of rubber or like elastomeric material, located in housing 2 of the sealing and clamping head. The housing 2 and the details of the sealing and clamping head are more completely shown in the above referred to U.S. Pat. 3,331,238 and it is not deemed necessary to show them here. The sleeve 1 is provided on the inside with a number of prismatic bars 3 extending in the axial direction and arranged around the circumference of the housing narrowly spaced from one another.

Each of the prismatic bars 3 is provided with notches or recesses 4 at both sides extending in the axial direction. These notches 4 form chambers to hold leaf springs 5 which push apart adjoining bars 3 and thus press all the bars 3 against sleeve 1. This arrangement of springs 5 in notches or pockets 4 secures the bars 3 as well as the springs 5 against radial dislocation. The inside surfaces 6 of bars 3 are perfectly uniform and free of any recess or notches.

Figure 3:
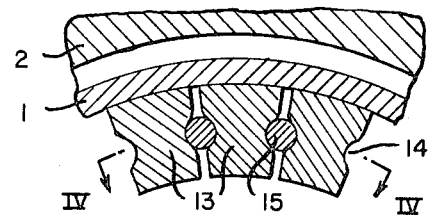
FIG. 3 is a fragmentary cross section of a second embodiment of a clamping device according to our invention.
Figure 4:
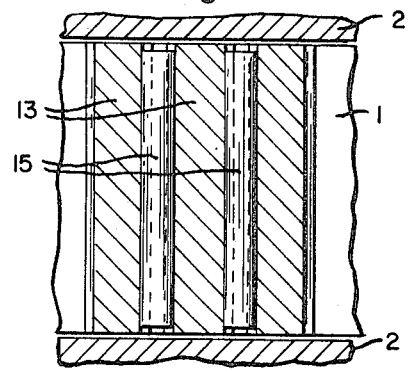
FIG. 4 is a fragmentary section on the line IV–IV of FIG. 3.

In the design, according to FIGS. 3 and 4, the bars 13 also have pockets 14 at the sides, which are however oval in shape and suited to hold springs which consist of cylindrical bars 15 made out of elastic material, especially of rubber.

The designs, according to FIGS. 1 to 4, have among other things the advantage that bars 3 and 13 can be made out of drawn material without requiring any machining.

Figure 5:
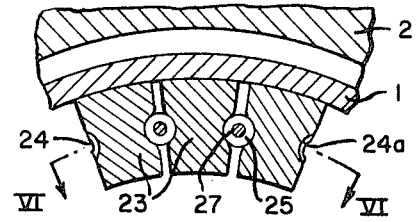
FIG. 5 is a fragmentary cross section of a third embodiment of clamping device according to our invention.
Figure 6:
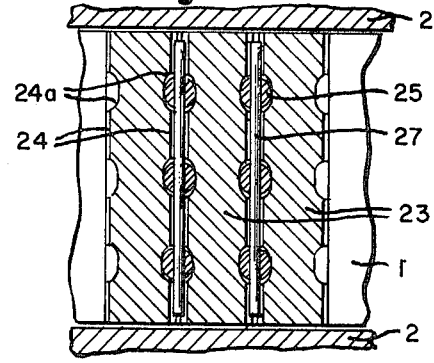
FIG. 6 is a section on the line VI–VI of FIG. 5.

The design, according to FIGS. 5 and 6, differs from the design according to FIGS. 3 and 4, with regard to the shape of the bars 23 whereby the longitudinal grooves have additional notches 24a as well as notches 24. The springs 25 are also different and consist in this design of elastic balls 25 which are connected by strings 27 and located in the notches 24a. By using this design with the notches 24a the advantage of simple machining and manufacturing of the bars 23 is lost. However, an additional advantage is gained insofar that the springs and bars are secured also against relative axial dislocation.

Figure 2:
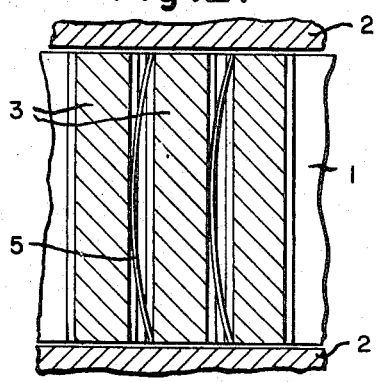
FIG. 2 is a fragmentary section on the line II–II of FIG. 1.

In the designs according to FIGS. 7 to 12, leaf springs are used similar to springs 3 in FIGS. 1 and 2, which are arranged between the bars, corresponding to bars 3 of FIGS. 1 and 2. Different however are the elements used to secure these springs against radial dislocation. In the designs, according to FIGS. 7 to 12, the bars 33, 43 and 53 do not have any notches at the sides. Instead, they have bores 38, 48 and 58 running in circumferential direction, into which the securing elements protrude.

Figure 7:
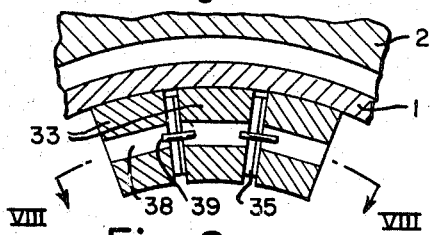
FIG. 7 is a fragmentary cross section of a fourth embodiment of clamping device according to our invention.
Figure 8:
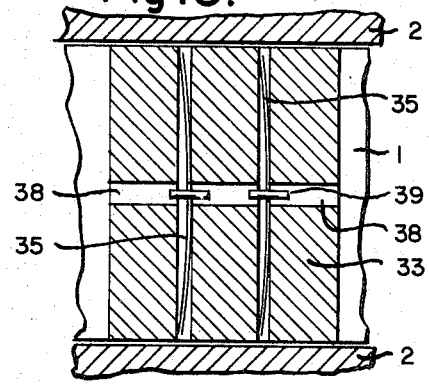
FIG. 8 is a section on the line VIII–VIII of FIG. 7.

In the design according to FIGS. 7 and 8, a pin 39 firmly pressed in is provided for each spring 35 which reaches at both sides into the bores 38 adjoining springs 35. This way, the bars 33 and springs 35 are secured against radial and axial relative dislocation. It is also possible to use several bores 38 and pins 39 over the entire length of the bar.

FIGS. 9 and 10 differ from FIGS. 7 and 8 in the design insofar as the pins 49 pressed into the springs are replaced by slightly bent and loosely arranged pins 49a which are offset against each other. These pins also reach into the bores 48 as in FIGS. 7 and 8, whereby the bores in this case are also arranged offset to each other. This offset, and in one bar overlapping design guarantees that the bar groups with their springs are secured. In the design according to FIGS. 9 and 10, the pins 49a have to be bent, of course, which means they form a segment of a circle.

The design, according to FIGS. 11 and 12, has been developed by combining pins 59 corresponding to pins 49 of the design of FIGS. 7 and 8 to an almost enclosed ring 59b which extends through all bores 58 of almost all bars 53. The bores 58 do not have to be offset arranged to each other in this design, in contrast to design according to FIGS. 9 and 10, . A bent sleeve 60 is used to bridge the gap between the ends of the ring-type pin 59b whereby this sleeve is connected to the end 63 of pin 59b. Circular bent pin 59b thus forms together with the sleeve 60 a ring which can change its diameter within limits by elastic deformation.

The functioning principle of designs according to FIGS. 7 to 12 is the same.

In the design according to FIGS. 13 and 14, no springs are arranged between the bars. The required spring action is achieved by making bars 73 out of a highly elastic material, and besides that, by manufacturing these bars slightly curved as can be seen in FIG. 14, thus creating spring action between the bars which now take on the additional function of springs 5 in the designs illustrated in FIGS. 1 and 2. Interconnecting notches 74 and webs or tongues 75 located at the sides of bars 73 are the securing elements in this design, thus preventing a radial dislocation of bars 73.

While we have illustrated and described certain presently preferred embodiments of our invention in the foregoing specification, it will be understood that this invention may otherwise be embodied within the scope of the following claims.

We claim:

1. A clamping device for sealing and clamping heads for holding and closing one end of hollow bodies, such as pipe, comprising a housing, a cylindrical elastic sealing sleeve and an elastic cylindrical clamping part arranged at the inner circumference of this sleeve within the housing, said clamping part being made up of a plurality of spaced axial bars of harder elastic material than the sleeve, said bars having radially spaced inner and outer faces and being held apart by spring force acting in at least one axial recess in each bar facing the next adjacent bar, each such recess including a portion radially closed from and spaced from the inner and outer faces.

2. A clamping device as claimed in claim 1 wherein springs are arranged in said axial recesses in the facing sides of adjacent bars, and said recesses are channels open recesses are channels open toward a side connecting said inner and outer faces.

3. Clamping device according to claim 2 wherein said recesses are provided at both sides of each bar, the adjacent recesses of each adjacent bars receiving a spring holding the bars apart.

4. Clamping device according to claim 2 wherein the springs are secured by pins which reach through the springs in the circumferential direction and protrude into the bars at each recess.

5. Clamping device according to claim 4 wherein the pins are combined to form ring segments.

6. Clamping device according to claim 1 wherein the bars are shaped so that they create spring action in the circumferential direction and adjoining bars are secured against radial dislocation and against each other by interconnecting notches and webs on adjacent facing surfaces.